United States Patent
Jantzi et al.

(10) Patent No.: US 11,109,309 B2
(45) Date of Patent: Aug. 31, 2021

(54) SYSTEMS AND METHODS FOR ESTABLISHING SHORT-RANGE COMMUNICATION LINKS BETWEEN ASSET TRACKING DEVICES

(71) Applicant: BlackBerry Limited, Waterloo (CA)

(72) Inventors: Jason Wayne Jantzi, St. Clemens (CA); Mahendra Fuleshwar Prasad, Waterloo (CA); Mark Edward Reaume, Waterloo (CA); Adam Paul Jocksch, Waterloo (CA); Jeremy Thompson, Waterloo (CA); Srdjan Damjanovic, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/369,396

(22) Filed: Mar. 29, 2019

(65) Prior Publication Data

US 2020/0314742 A1    Oct. 1, 2020

(51) Int. Cl.
*H04W 48/20*     (2009.01)
*H04W 4/021*     (2018.01)
(Continued)

(52) U.S. Cl.
CPC ........ *H04W 48/20* (2013.01); *H04B 17/327* (2015.01); *H04W 4/021* (2013.01);
(Continued)

(58) Field of Classification Search
CPC . H04W 80/04; H04W 36/18; H04W 36/0011; H04W 36/14; H04W 36/08
(Continued)

(56) References Cited

U.S. PATENT DOCUMENTS

| 5,553,243 A | * | 9/1996 | Harrison | H04W 84/08 375/224 |
| 5,761,240 A | * | 6/1998 | Croucher, Jr. | H04L 1/0057 375/224 |

(Continued)

FOREIGN PATENT DOCUMENTS

EP    3336782 A1    6/2018

OTHER PUBLICATIONS

EPO: Extended European Search Report relating to EP application No. 20162705.6, dated Aug. 24, 2020.

*Primary Examiner* — Peter G Solinsky
*Assistant Examiner* — Sanjay K Dewan
(74) *Attorney, Agent, or Firm* — Rowand LLP

(57) ABSTRACT

A method for managing radio communications between a gateway and a plurality of sensors of a system for tracking assets is disclosed. The method includes: obtaining properties of a currently tracked asset; determining a current connection configuration for radio connections between the gateway and the plurality of sensors; identifying a preferred connection configuration for radio connections between the gateway and the plurality of sensors based on the properties of the currently tracked asset, the preferred connection configuration having at least one physical layer characteristic that is different from the current connection configuration; and in response to the identifying, causing the gateway and at least one of the plurality of sensors to switch from the current connection configuration to the preferred connection configuration for establishing a new radio connection.

18 Claims, 6 Drawing Sheets

(51) Int. Cl.
  *H04W 36/26* (2009.01)
  *H04W 36/08* (2009.01)
  *H04W 4/38* (2018.01)
  *H04W 76/14* (2018.01)
  *H04B 17/327* (2015.01)
  *H04W 4/80* (2018.01)

(52) U.S. Cl.
  CPC ............ *H04W 4/38* (2018.02); *H04W 36/08* (2013.01); *H04W 36/26* (2013.01); *H04W 76/14* (2018.02); *H04W 4/80* (2018.02)

(58) Field of Classification Search
  USPC .......................................................... 370/331
  See application file for complete search history.

(56) References Cited

U.S. PATENT DOCUMENTS

| | | | | |
|---|---|---|---|---|
| 7,734,293 | B2* | 6/2010 | Zilliacus | H04W 36/0066 455/445 |
| 8,805,323 | B2* | 8/2014 | Ramprasad | H04W 12/12 455/405 |
| 8,907,782 | B2* | 12/2014 | Baker | G16H 10/60 340/539.12 |
| 10,306,397 | B2* | 5/2019 | La | H04W 52/0235 |
| 2005/0116821 | A1* | 6/2005 | Wilsey | G06K 7/1097 340/539.13 |
| 2007/0060108 | A1* | 3/2007 | East | H04W 4/024 455/414.1 |
| 2007/0115180 | A1* | 5/2007 | Kish | H01Q 21/29 343/700 MS |
| 2007/0286102 | A1* | 12/2007 | Shimokawa | H04W 74/08 370/310 |
| 2008/0082997 | A1* | 4/2008 | Um | H04N 21/4227 725/38 |
| 2010/0265061 | A1* | 10/2010 | Harmon | G06Q 10/08 340/539.13 |
| 2013/0030873 | A1* | 1/2013 | Davidson | G06Q 10/1091 705/7.36 |
| 2013/0219039 | A1 | 8/2013 | Ricci | |
| 2013/0322401 | A1* | 12/2013 | Visuri | H04W 36/08 370/331 |
| 2014/0066089 | A1* | 3/2014 | Monks | G08B 21/02 455/456.1 |
| 2014/0357295 | A1* | 12/2014 | Skomra | G06Q 10/0833 455/456.1 |
| 2015/0050885 | A1* | 2/2015 | Vincent | H04W 12/003 455/41.2 |
| 2015/0296332 | A1* | 10/2015 | Lee | G06K 19/0723 340/8.1 |
| 2015/0296482 | A1* | 10/2015 | Baskar | H04W 68/04 370/312 |
| 2016/0054448 | A1* | 2/2016 | Woolf | G01K 13/02 342/357.52 |
| 2016/0070703 | A1* | 3/2016 | Arora | G06F 16/9537 707/724 |
| 2016/0330743 | A1* | 11/2016 | Das | H04L 67/10 |
| 2017/0180929 | A1* | 6/2017 | Cavendish | H04W 4/50 |
| 2017/0228566 | A1* | 8/2017 | Sengstaken, Jr. | G06K 19/0716 |
| 2018/0020333 | A1* | 1/2018 | Gillen | H04W 4/40 |
| 2018/0027374 | A1* | 1/2018 | Wang | H04W 4/48 455/456.3 |
| 2018/0130016 | A1* | 5/2018 | Arena | G06Q 10/0832 |
| 2018/0184465 | A1* | 6/2018 | Chatterjee | H04L 41/0618 |
| 2018/0249130 | A1* | 8/2018 | Arena | G06Q 10/0833 |
| 2018/0249291 | A1* | 8/2018 | Shamim | H04W 4/029 |
| 2018/0321356 | A1* | 11/2018 | Kulkarni | G01S 5/04 |
| 2019/0035172 | A1* | 1/2019 | Seaman | G07C 5/02 |
| 2019/0103910 | A1* | 4/2019 | Alford | H04B 7/15507 |
| 2019/0122174 | A1* | 4/2019 | Gil | H04W 4/021 |
| 2019/0122322 | A1* | 4/2019 | Perez | H04W 4/02 |
| 2019/0342715 | A1* | 11/2019 | Pylappan | G01S 19/48 |
| 2020/0100137 | A1* | 3/2020 | Panchai | H04W 48/18 |
| 2020/0260379 | A1* | 8/2020 | Qaderi | H04W 72/042 |

\* cited by examiner

SYSTEMS AND METHODS FOR ESTABLISHING SHORT-RANGE COMMUNICATION LINKS BETWEEN ASSET TRACKING DEVICES

TECHNICAL FIELD

The present disclosure relates to data communications and, in particular, to systems and methods for establishing short-range communication links between active nodes of an asset tracking system.

BACKGROUND

Asset tracking systems provide visibility into various fleet assets, such as vans, trailer flatbeds, chassis, intermodal containers, and heavy equipment. These systems may employ mobile tracking devices that are associated with specific assets to track and monitor the assets during transit. The tracking devices may include wireless transceivers for communicating with remote asset tracking servers using any one of a number of wireless services, including 4G LTE, 3G UMTS, 2G GSM, WLAN/Wi-Fi, ISM band SubGHz, and/or Bluetooth®.

A tracking device may also serve as a gateway or central hub for communicating with other asset monitoring devices, such as wireless sensors. More generally, a tracking device may be communicably connected to a plurality of wireless monitoring devices in a point-to-multipoint configuration. To ensure effective monitoring of assets, it is desirable to maintain high performing and power optimized communication links between the central hub and wireless monitoring devices under various different asset tracking conditions.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
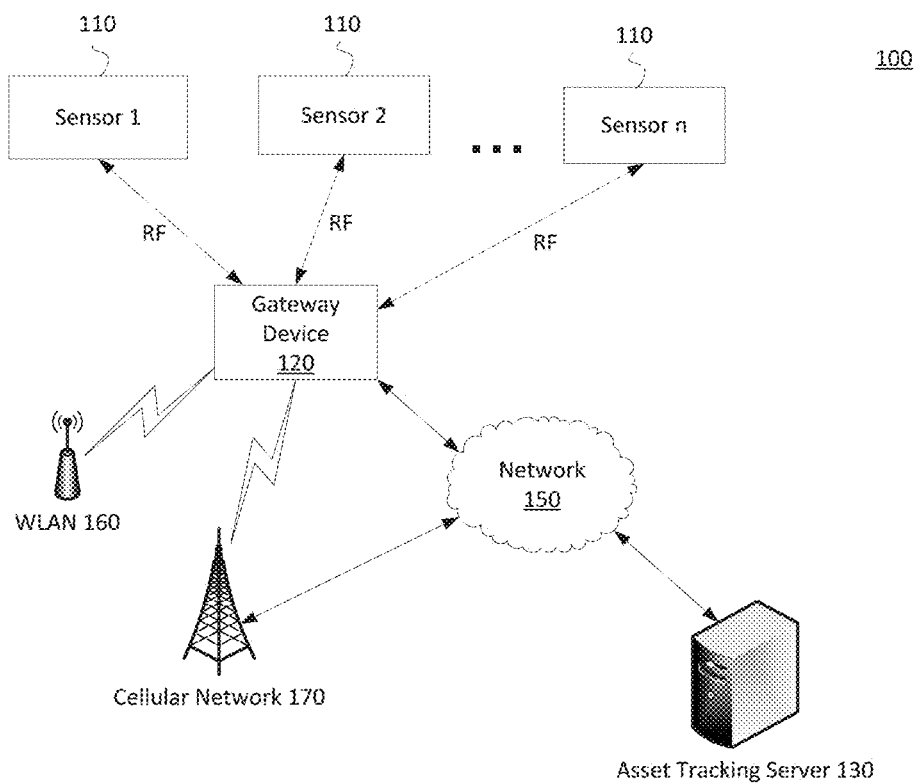
FIG. 1 is a block diagram showing components of an example system for tracking and monitoring assets.

In one aspect, the present disclosure describes a processor-implemented method for managing radio communications between a gateway and a plurality of sensors of a system for tracking assets. The method includes: obtaining properties of a currently tracked asset; determining a current connection configuration for radio connections between the gateway and the plurality of sensors; identifying a preferred connection configuration for radio connections between the gateway and the plurality of sensors based on the properties of the currently tracked asset, the preferred connection configuration having at least one physical layer characteristic that is different from the current connection configuration; and in response to the identifying, causing the gateway and at least one of the plurality of sensors to switch from the current connection configuration to the preferred connection configuration for establishing a new radio connection.

In another aspect, the present disclosure describes a mobile transceiver. The mobile transceiver may be a component of a system for tracking assets. The mobile transceiver includes memory, a short-range communication module, and a processor coupled to the memory and the short-range communication module. The processor is configured to: obtain properties of a currently tracked asset; determine a current connection configuration for radio connections between the mobile transceiver and a plurality of sensors of a system for tracking assets; identify a preferred connection configuration for radio connections between the mobile transceiver and the plurality of sensors based on the properties of the currently tracked asset, the preferred connection configuration having at least one physical layer characteristic that is different from the current connection configuration; and in response to the identifying, switch from the current connection configuration to the preferred connection configuration for establishing a new radio connection with at least one of the plurality of sensors.

In another aspect, the present disclosure describes an asset tracking system. The system includes a mobile transceiver associated with a currently tracked asset and at least one sensor. The at least one sensor is configured to: obtain properties of the currently tracked asset; determine a current connection configuration for radio connections between the at least one sensor and the mobile transceiver; identify a preferred connection configuration for radio connections between the at least one sensor and the mobile transceiver based on the properties of the currently tracked asset, the preferred connection configuration having at least one physical layer characteristic that is different from the current connection configuration; and in response to the identifying, switch from the current connection configuration to the preferred connection configuration for establishing a new radio connection with the mobile transceiver.

Other example embodiments of the present disclosure will be apparent to those of ordinary skill in the art from a review of the following detailed descriptions in conjunction with the drawings.

Asset tracking systems often employ a mobile tracking device associated with a tracked asset and one or more sensors that are configured to communicate wirelessly with the mobile tracking device. The mobile tracking device effectively acts as a gateway or central hub for communicating with the sensors in a point-to-multipoint configuration. Sensor data generated by the sensors may be transmitted, via short-range radio frequency communication, to the mobile tracking device for processing, conversion, and/or further transmission to a remote asset tracking server. The mobile tracking device may transmit data (e.g. over-the-air software updates, configuration settings, etc.) directly to the sensors through RF communication.

Because asset tracking scenarios can vary widely, maintaining high performing communication links between the gateway device and sensors under various uniquely different asset tracking conditions may be challenging. Different cargo containers may be constructed of different materials, have different cargo, and inherently show different short-range radio propagation characteristics. For example, a sea bin or intermodal that is made of metal and filled with cargo may be difficult for radio waves to penetrate, whereas flatbeds and wood trailers may be generally conducive to radio propagation.

The present disclosure provides an asset tracking solution which facilitates optimizing RF performance and power consumption of short-range RF links between a mobile tracking/gateway device and sensors of an asset tracking system. In an aspect, a technique for managing radio communications between a gateway device and a plurality of sensors is proposed. The gateway device and the sensors may be configured to dynamically tune their short-range RF physical layer radio configurations to account for the current asset tracking conditions (e.g. surrounding environment, density of devices, properties of the asset and containers, etc.). In particular, the gateway device and the sensors may employ one or more heuristics to identify a preferred radio configuration based on the properties of a currently tracked asset. If the radio configuration selected using the heuristics is different from a current radio configuration, the gateway device and the sensors may establish new radio connections using the preferred radio configuration. The switch in radio configuration may, for example, result in tuning of different parameters in the RF physical layer such as, without limitation, frequency, channel spacing, number of channels, frequency hopping, modulation type (2GFSK, 4GFSK, OQPSK, OOK), data transmission rate, frequency deviation, direct-sequence spread spectrum (DSSS), spreading factor, filter type, bandwidth-time product, and output power. In this way, an optimal radio configuration for the particular asset and tracking conditions may be selected for use in radio communications between the gateway device and associated sensors. For example, changes in radio configurations for the active nodes of an asset tracking system (i.e. gateway device, sensors) may lead to higher RF performance, lower transmission power, reduced current drain, and improved device battery life.

In another aspect, a method for operating a mobile tracking device is described. The mobile tracking device may be deployed as part of an asset tracking system for tracking and monitoring a particular asset. Based on the properties of the asset and a set of one or more predetermined heuristics, the mobile tracking device may select a preferred radio configuration from a plurality of different radio configurations for use in RF communication with sensors of the asset tracking system. If the preferred radio configuration is different from a current radio configuration for radio connections with the sensors, the mobile tracking device is configured to switch to the preferred radio configuration to establish new radio connections with the sensors. The different radio configurations may be certified for one or both of the mobile tracking device and the sensors to support the change in radio frequency physical layer characteristics.

In another aspect, a method for operating a sensor of an asset tracking system is described. The sensor may be deployed in association with a particular asset. Based on the properties of the asset and a set of one or more predetermined heuristics, the sensor may select a preferred radio configuration for use in RF communication with a gateway device of the asset tracking system. If the preferred radio configuration is different from a current radio configuration for radio connections with the gateway device, the sensor is configured to switch to the preferred radio configuration to establish new radio connections with the gateway device.

Reference is first made to FIG. 1, which shows an exemplary operating environment in accordance with embodiments of the present disclosure. FIG. 1 illustrates an exemplary system 100 for tracking and monitoring an asset.

The gateway device 120 is an electronic device. The gateway device 120 is used for tracking and monitoring an asset. In particular, the gateway device 120 may be used to collect data relating to an asset and/or a container, such as location, performance, utilization, and other operational details. The gateway device 120 is associated with a specific asset or container. For example, the gateway device 120 may be attached to an asset or container.

The gateway device 120 may be communicably connected to a plurality of sensors 110. The sensors 110 are configured to sense or measure an environment of the tracked asset. The sensors 110 may be used to measure, among others, temperature, pressure, humidity, container on/off setting, door open/close event, mileage, tire pressure, and weigh-in motion. For example, the sensors 110 may comprise a light sensor, temperature sensor, pressure sensor, humidity sensor, gyroscope, accelerometer, time-of-flight sensors, altimeter, and other sensors such as door contact switches. The sensors 110 may be attached to a tracked asset or container, a transport vehicle, or located in close proximity to a tracked asset/container. The sensor data obtained via the sensors 110 are stored in memory of the respective sensors, and are transmitted to the gateway device 120 on a regular basis or upon request.

The data that is collected at the gateway device 120, such as location and/or sensor data, may be stored in an asset tracking log. The logged data may be transmitted to an asset tracking server (or fleet management server) 130. The asset tracking server 130 may be implemented as one or more server modules and is typically located behind a firewall. The asset tracking server 130 provides administrative control and management capabilities over a plurality of managed mobile tracking devices, such as gateway device 120. For example, the asset tracking server may maintain a database of tracked assets and tracking devices associated with those assets. The database may include asset/container information such as location, operation or utilization status, type/construction, capacity, current radio connection configuration, and whitelisted sensors.

The gateway device 120 may be implemented as a mobile transceiver that is configured to communicate with one or more sensors 110 and the asset tracking server 130. The gateway device 120 may be configured to communicate with a plurality of different radio access networks, such as a cellular network 170 using suitable wireless data communication protocols and standards. The gateway device 120 may also be configured to communicate with a wireless local area network (WLAN) 160 via a WLAN access point. The WLAN 160 may include a wireless network which conforms to IEEE 802.11x standards (sometimes referred to as Wi-Fi). Other communication protocols may be used for the WLAN 160 in other embodiments.

The network 150 is a computer network. The network 150 allows computer systems in communication therewith to communicate. For example, as illustrated, the network 150 may allow the gateway device 100 to communicate with a remote asset tracking server 130.

Figure 2:
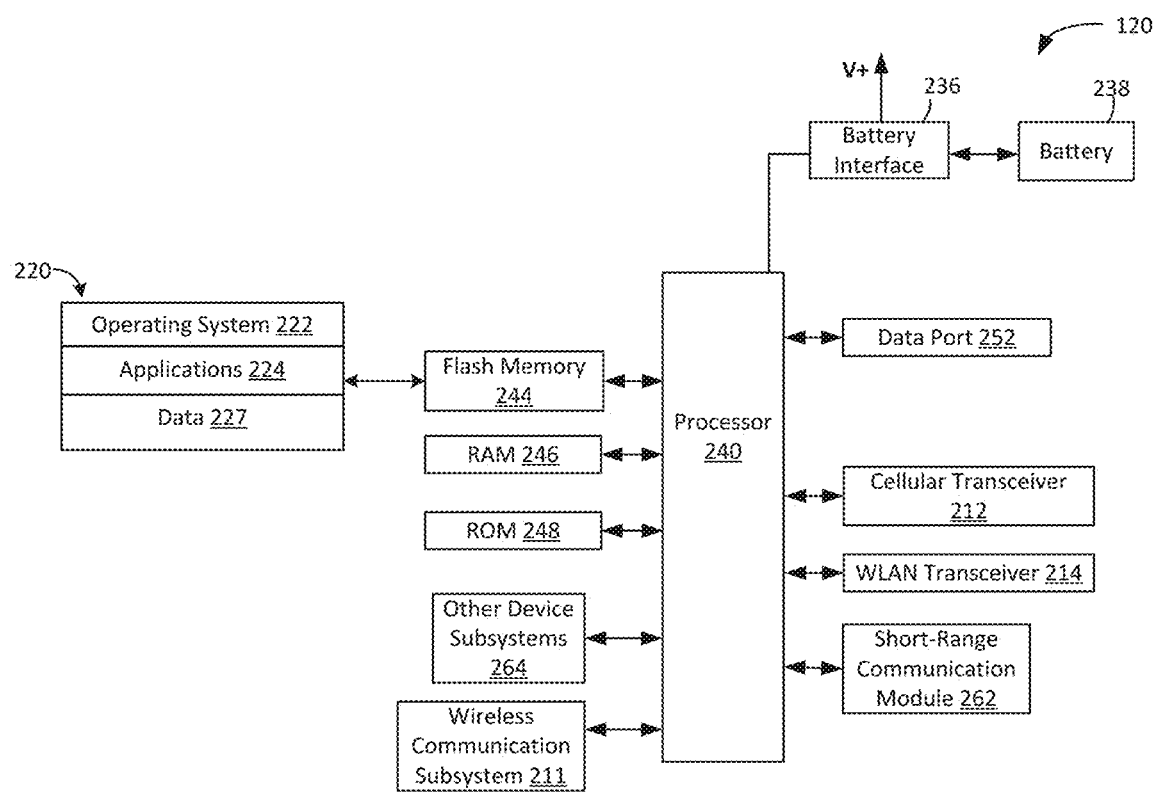
FIG. 2 is a block diagram showing components of an example mobile transceiver for use in tracking an asset.

Reference is now made to FIG. 2, which illustrates an example gateway device 120. The gateway device 120 includes a housing (not shown) which houses components of the gateway device 120. Internal components of the gateway device 120 may be constructed on a printed circuit board (PCB). The gateway device 120 includes a controller including at least one processor 240 (such as a microprocessor) which controls the overall operation of the gateway device 120. The processor 240 interacts with device subsystems such as a wireless communication subsystem 211 for exchanging radio frequency signals with a wireless network to perform communication functions. The processor 240 interacts with additional device subsystems including one or more input interfaces (such as control buttons, and/or a touch-sensitive overlay associated with a touchscreen display), flash memory 244, random access memory (RAM) 246, read only memory (ROM) 248, auxiliary input/output (I/O) subsystems, a data port 252 (which may be a serial data port, such as a Universal Serial Bus (USB) data port), one or more output interfaces, a short-range communication subsystem 262, and other device subsystems generally designated as 264. Some of the subsystems shown in FIG. 2 perform communication-related functions, whereas other subsystems may provide "resident" or on-device functions.

The gateway device 120 may store data 227 in an erasable persistent memory, which in one example embodiment is the flash memory 244. The data 227 may include asset tracking logs containing data collected by the gateway device 120 or sensor data received from one or more connected sensors. The data 227 may also include identities of whitelisted devices (e.g. sensors associated with tracked asset), wireless connections data, current and available radio configurations, and radio connections data (e.g. signal strength, elapsed time since last connection to sensors, etc.).

In at least some example embodiments, the gateway device 120 is provided with a service routing application programming interface (API) which provides an application with the ability to route traffic through a serial data (i.e., USB) or Bluetooth® connection to the host computer system using standard connectivity protocols.

The gateway device 120 also includes a battery 238 as a power source. The battery 238 may comprise one or more rechargeable batteries that may be charged, for example, through charging circuitry coupled to a battery interface 236, such as the serial data port 252. Alternatively, the battery 238 may comprise one or more non-rechargeable primary cell batteries (e.g. lithium-thionyl chloride battery). The battery 238 provides electrical power to at least some of the electrical circuitry in the gateway device 120, and the battery interface 236 provides a mechanical and electrical connection for the battery 238. The battery interface 236 is coupled to a regulator (not shown) which provides power V+ to the circuitry of the gateway device 120.

The short-range communication subsystem 262 provides for communication between the gateway device 120 and different systems or devices, such as sensors 110 of FIG. 1. For example, the short-range communication subsystem 262 may include an infrared device and associated circuits and components, or a wireless bus protocol compliant communication mechanism such as a Bluetooth® communication module to provide for communication with similarly-enabled systems and devices. The short-range communication subsystem 262 may comprise an RF module which complies with a defined protocol for RF communications such as Zigbee, Bluetooth low energy, Wi-Fi, or which implements a proprietary protocol.

The processor 240 operates under stored program control and executes software modules 220 stored in memory such as persistent memory; for example, in the flash memory 244. As illustrated in FIG. 2, the software modules 220 may include operating system software 222 and one or more additional applications 224.

The gateway device 120 also includes one or more wireless transceivers for exchanging data communication. The wireless transceivers may comprise a cellular transceiver 212 for communicating with a plurality of different radio access networks, and/or a WLAN transceiver 214 for communicating with a WLAN. The wireless transceivers may additionally comprise a satellite transceiver for receiving and sending satellite signals. The gateway device 120 may use signals received by the satellite transceiver from satellites of a satellite network to determine its location. In some embodiments, the satellite network may comprise satellites which are part of a global navigation satellite system (GNSS or GPS) that provides autonomous geospatial positioning with global coverage.

Figure 3:
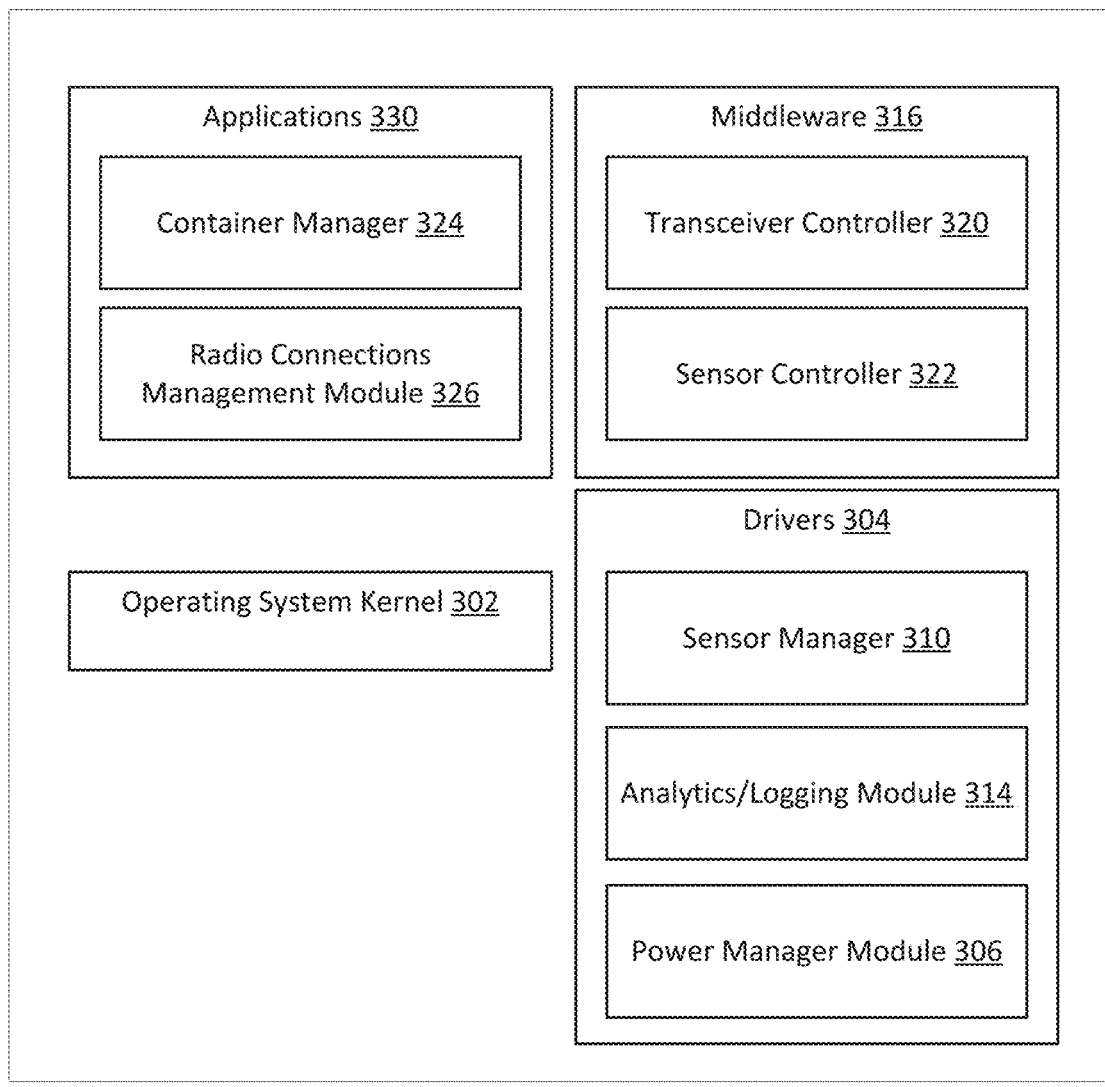
FIG. 3 is a block diagram of a simplified software architecture of the mobile transceiver of FIG. 2.

Reference is now made to FIG. 3, which is a block diagram of a software architecture of a mobile tracking/gateway device, in accordance with example embodiments of the present disclosure. The software modules include an operating system kernel 302, drivers 304, middleware 316, and applications 330. The drivers 304 may include a sensor manager 310, an analytics/logging module 314, and a power manager module 306. The middleware 316 may include a transceiver controller 320 and a sensor controller 322. Various applications may execute on top of the operating system kernel 302, such as a container manager 324 and a radio connections management module 326. The radio connections management module 326 may maintain connections data for a plurality of radio connections established by the gateway device. The radio connections management module 326 may also be configured to obtain valid connection configurations data, evaluate a heuristic for selecting preferred connection configurations, and, in conjunction with the transceiver controller 320, manage operations of the wireless transceivers of the gateway device.

Figure 4:
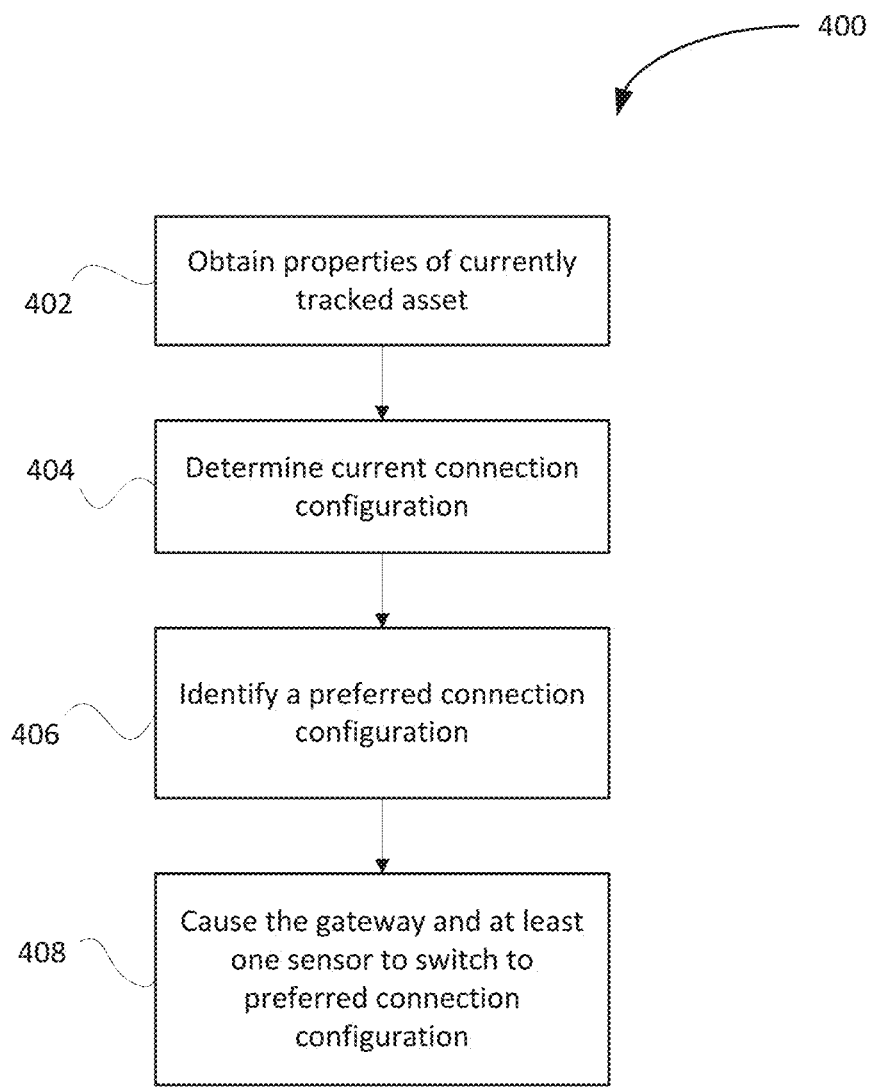
FIG. 4 shows, in flowchart form, an example method for managing radio communications between a gateway and a plurality of sensors of an asset tracking system.

Reference is now made to FIG. 4, which shows, in flowchart form an example method 400 for managing radio communications between a gateway device and a plurality of sensors of an asset tracking system. Specifically, the method 400 may be used to select a suitable radio configuration for establishing radio connections between a gateway device and sensors associated with the same tracked asset. The method 400 may be implemented by the gateway device and one or more of the sensors, either collectively or independently. In particular, the gateway device and a sensor may independently perform the method 400, or they may jointly perform the method 400 in establishing radio connections. For illustration purposes, the method 400 will be described below from the reference of a gateway device.

In operation 402, the gateway device obtains properties of a currently tracked asset (or container). The properties of the tracked asset may, for example, include a type of asset, material of construction, dimensions, mounted location of tracking/gateway device on asset, and cargo capacity. The properties may relate to asset tracking environmental conditions, such as number and positions of sensors. The properties may be manually inputted and stored in memory of the gateway device, and/or communicated to the gateway device from an asset tracking server. For example, configuration information delivered from an asset tracking server may specify the type and construction of the tracked asset with which the gateway device is associated.

In operation 404, the gateway device determines a current connection configuration for radio connections between the gateway and a plurality of sensors associated with the tracked asset. The current connection information may be stored in memory of the gateway device, or maintained by a configurations manager, such as the radio connections management module 326 of FIG. 3. Each time a sensor associated with a tracked asset is activated, an initial pairing of the sensor with the gateway device may be completed using a default radio configuration. The default radio configuration may be a pre-defined connection configuration that is independently stored or accessible by the gateway device and the sensor (e.g. accessible at or transmitted from an asset tracking server).

In operation 406, the gateway device identifies a preferred connection configuration for radio connections between the gateway device and the sensors of the asset tracking system. The selection of the preferred connection configuration is based on, at least, the properties of the currently tracked asset. In particular, an optimal connection configuration may be selected from a plurality of different connection configurations for establishing new radio connections between the gateway device and sensors for the particular asset/container that is being tracked.

The gateway device may store or have access to pre-characterized connection (radio) configuration profiles. In at least some embodiments, the selection of the preferred connection configuration may be based on a decision from a selection heuristic. The selection heuristic may be informed by multiple different input factors. In some embodiments, the gateway device may identify one or more viable radio connections between the gateway device and the plurality of sensors. For example, a radio connections manager of the gateway device may produce a list of past and available radio connections with the sensors. For one or more of the available connections, the gateway device may determine its quality. The gateway device may, for example, evaluate or obtain historical values for parameters, such as a received signal strength indicator (RSSI), bit error rate (BER), or a number of cyclic redundancy check (CRC) errors for the viable radio connections.

In some embodiments, the heuristic may also be informed by configuration information delivered from the asset tracking server. For example, the gateway device may receive, from the asset tracking server, information identifying new whitelisted sensors with which the gateway device has had no previous communication. As another example, the gateway device may receive information indicating presence of the gateway device within a predefined geo-fence. Using the current location of the gateway device, the asset tracking server may, for example, identify a potential high density of devices (e.g. gateway/sensor pairs) using RF communication in the gateway device's proximity. The asset tracking server may recognize an increase in RF noise and increased likelihood of interference in RF communication. The density data can be relayed to the gateway device and/or sensors to inform the configuration selection heuristic. For example, the heuristic may decide, based on the density data, to switch to DSSS, which may be optimal for noisy RF environments.

An asset tracking server may manage gateway devices and sensors for a plurality of different assets. That is, an asset tracking server may be communicably connected to a plurality of gateway devices associated with respective tracked assets. In some embodiments, an asset tracking server may determine an optimal connection configuration for multiple gateway devices based on, for example, locations of the assets, density of gateway/sensor pairs, environmental conditions, etc. that are monitored by the asset tracking server. For example, if an asset tracking server determines that multiple different tracked assets are located in the same geo-fence, the server may decide on an arrangement of connection configurations for the devices (i.e. gateway device, sensors) associated with the tracked assets to minimize the likelihood of RF interference. In particular, the server may decide on an arrangement of two or more different connection configurations for the assets, rather than an arrangement in which devices associated with the assets all use the same connection configuration.

In some embodiments, historical data relating to connections strengths of radio connections may be included as a heuristic factor. For example, the gateway device may retrieve connection strengths data for radio connections associated with one or more valid connection configurations. A valid connection configuration may be a connection configuration that complies with various standards and regulatory requirements relating to, for example, allowable transmitter power output, harmonics, and band edge measurements. This information may be stored in memory of the gateway device, or delivered to the gateway device from the asset tracking server.

Other heuristic factors may include: connection strength, sensitivity level, etc. of the current connection configuration; and elapsed time since most recent successful connections between the gateway device and known sensors. In some embodiments, the gateway device may rank a plurality of valid connection configurations based on their suitability for the asset tracking system or the currently tracked asset/container. Based on the ranking, the gateway device may select the highest ranked one of the valid connection configurations as the preferred connection configuration.

The gateway device then determines whether to switch to a different connection configuration. If the heuristic decides that the current operating conditions (i.e. connection configurations) are acceptable, no change will take place and the gateway device and sensors will continue with their normal operation. However, if the heuristic decides that another connection configuration having at least one different physical layer characteristic is preferred, a process of switching connection configurations will be initiated.

The evaluation of current connection configuration may be performed on a regular (e.g. periodic) basis, upon detection of a trigger condition, or on receipt of a command. For example, the RSSI or link performance between gateway devices and sensors may be monitored and upon detecting that a particular radio profile does not meet a targeted threshold performance, the gateway device and/or sensors may evaluate available connection configurations to determine whether a switch of connection configuration is desirable.

In response to identifying a different preferred connection configuration, the gateway device and the sensors are caused to switch from the current connection configuration to the preferred connection configuration for establishing new radio connections, in operation 408. In particular, once the heuristic decides that a different connection configuration is optimal, the gateway device and the individual sensors may independently attempt to establish radio connections with each other using the preferred connection configuration. The gateway device and the sensors use a heuristic informed by the same input data, in order to increase the likelihood of both heuristics arriving at the same output (i.e. preferred connection configuration).

Figure 5:
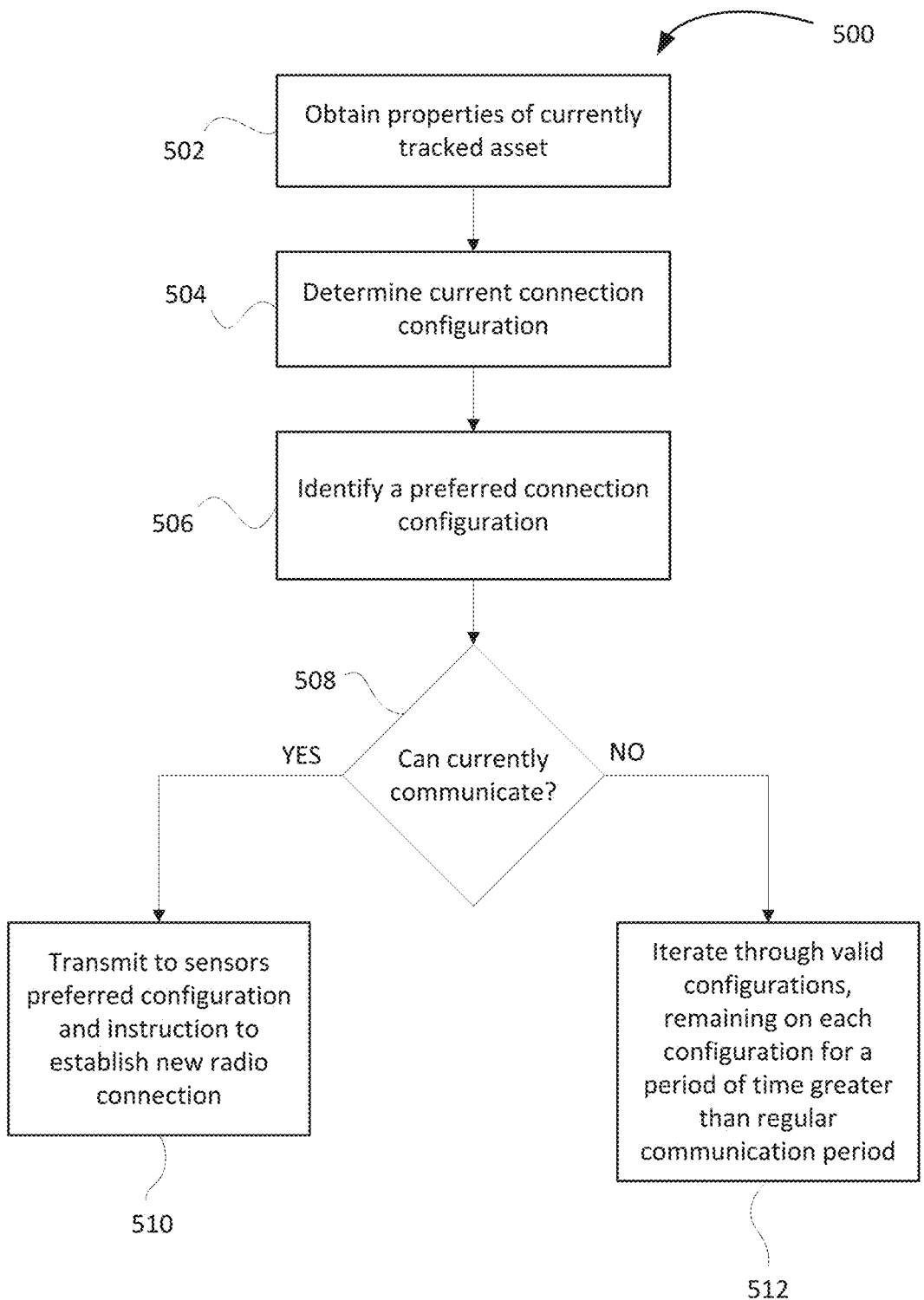
FIG. 5 shows, in flowchart form, an example method for operating a gateway device of an asset tracking system.

Reference is now made to FIG. 5, which shows, in flowchart form an example method 500 for operating a gateway device of an asset tracking system. Specifically, the method 500 may be implemented by a gateway device for establishing radio connections with sensors associated with a tracked asset/container. For example, the method 500 may be performed by one or more of a radio connections manager, and transceiver controller modules of the gateway device.

Operations 502, 504 and 506 correspond to operations 402, 404 and 406 of method 400. The gateway device obtains properties of a currently tracked asset in operation 502, determines a current connection configuration for radio connections with sensors of the asset tracking system in operation 504, and identifies a preferred connection configuration in operation 506. The preferred connection configuration is identified based, at least in part, on the selection heuristic described above. In some embodiments, the heuristic for the gateway device may output a ranking of connection configurations rather than a single preferred connection configuration. That is, the heuristic may provide a list of connection configurations that are ranked according to their suitability for the particular asset, tracking conditions, data rate requirements of the sensor, etc.

In operation 508, the gateway device determines whether the gateway device is communicably connected to the plurality of sensors of the asset tracking system. That is, the gateway device checks whether established connections exist between the gateway device and the sensors. If the gateway device determines that connections exist, the gateway device transmits to one or more of the sensors via the connections, a message indicating the preferred connection configuration in operation 510. Once the sensor modules are notified of the preferred connection configuration, they will re-initialize their radio to use the preferred connection configuration and attempt to re-establish a connection to the gateway device.

If there are no established connections between the gateway device and the sensors, the gateway device deploys connection configurations according to the decision output of the heuristic. In particular, the gateway device switches to the preferred connection configuration and awaits connection attempts from one or more of the sensors. In the case when there is no established connection, the gateway device and the sensors may rely on use of a regular communication period for coordinating their radio connection strategies. The gateway device deploys connection configurations according to the decision output of the heuristic, and remains on each configuration for a period of time that is slightly greater than the duration of a regular communication period. This can ensure that a sensor that wakes once during a regular communication period is able to successfully establish a connection with the gateway device. If no successful connection is established with a sensor, the gateway device may try a "next-best" connection configuration as decided by the heuristic in a ranking of connection configurations. This process of iterating through a list of ranked connection configurations may continue until the gateway device is able to communicate successfully with a known sensor. The gateway device may remain in each connection configuration for predefined length of time longer than the regular communication period. If all plausible connection configurations have been attempted unsuccessfully, the gateway device may start over with the preferred connection configuration as suggested by the heuristic or abandon further connection attempts.

Figure 6:
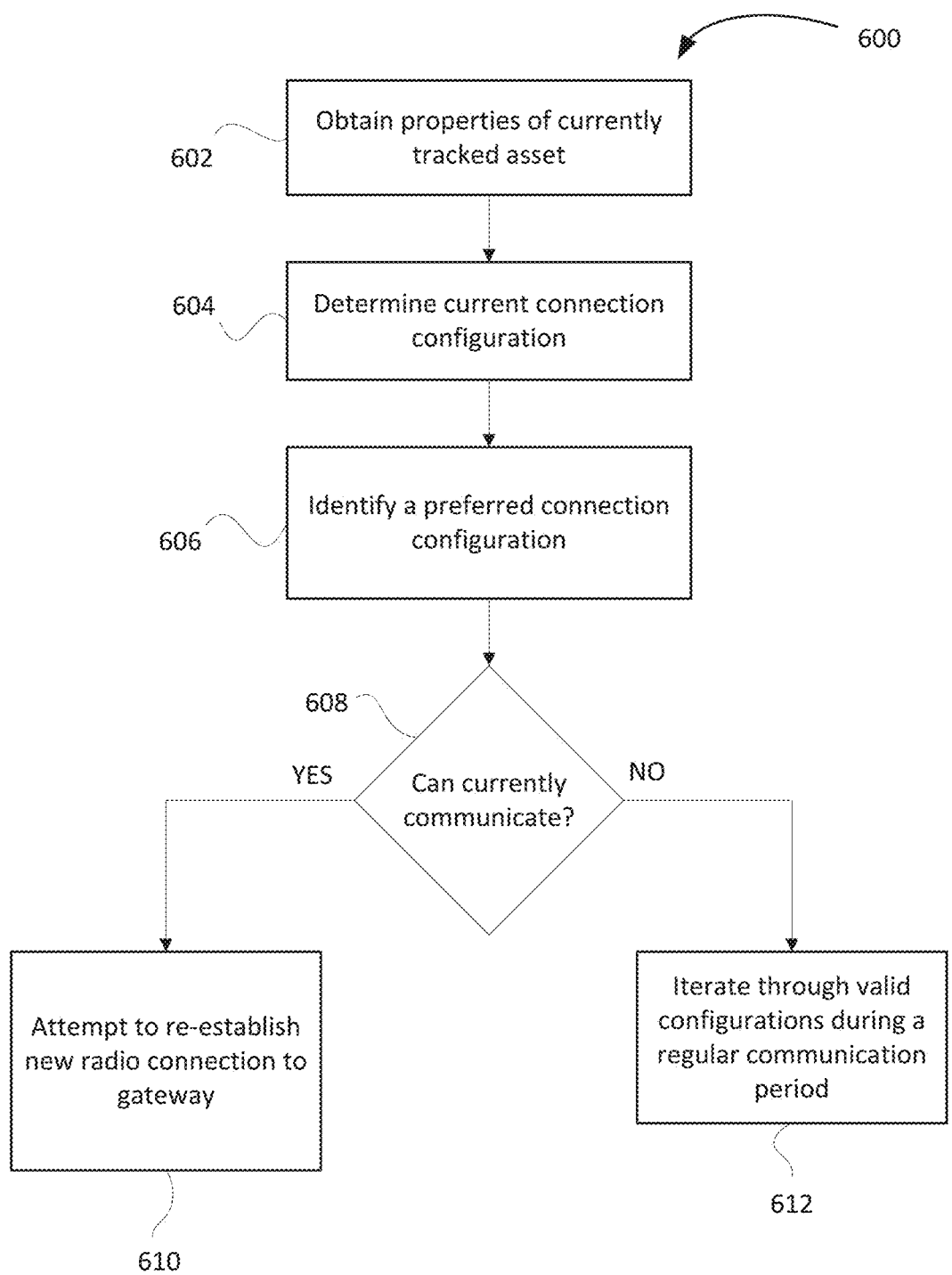
FIG. 6 shows, in flowchart form, an example method for operating a sensor of an asset tracking system.

Reference is now made to FIG. 6, which shows, in flowchart form an example method 600 for operating a sensor of an asset tracking system. Specifically, the method 600 may be implemented by a sensor for establishing a radio connection with a gateway device associated with a tracked asset/container.

Operations 602, 604 and 606 correspond to operations 402, 404 and 406 of method 400. The sensor obtains properties of a currently tracked asset in operation 602, determines a current connection configuration for radio connections with a gateway device of the asset tracking system in operation 604, and identifies a preferred connection configuration in operation 606. The preferred connection configuration is identified based, at least in part, on the selection heuristic described above. In some embodiments, the heuristic for the sensor may output a ranking of connection configurations rather than a single preferred connection configuration. That is, the heuristic may provide a list of connection configurations that are ranked according to their suitability for the particular asset, tracking conditions, etc.

In operation 608, the sensor determines whether the sensor is communicably connected to the gateway device of the asset tracking system. That is, the sensor checks whether an established connection exists between the sensor and the gateway device. If the sensor determines that a connection exists, the sensor re-initializes its radio to use the preferred connection configuration and attempt to establish a new radio connection to the gateway device in operation 610.

If the re-connection attempt under the preferred connection configuration is unsuccessful or if there is no established connection to the gateway device, the sensor will attempt to establish a new radio connection using the preferred connection configuration decided by the heuristic. In particular, the sensor switches to the preferred connection configuration and attempts to connect to the gateway device once per regular communication period. On each connection attempt, the sensor will use the preferred connection configuration suggested by the heuristic. If unsuccessful, the sensor switches quickly to a "next-best" configuration. If all valid configurations output by the heuristic have been evaluated unsuccessfully and no radio connection is established with the gateway device, the sensor will switch to a "sleep mode", or low-power/power management mode. The sensor disables radio functionalities in the "sleep mode" and remains in the sleep mode until the regular communication period ends. The sensor then wakes at the beginning of the next communication period and iterates through a ranking of connection configurations, as suggested by the heuristic, to attempt to establish a new radio connection with the gateway device.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A processor-implemented method for managing radio communications between a gateway and a plurality of sensors of a system for tracking assets, the method comprising:
determining at least one of a material of construction, dimensions, or cargo capacity of a currently tracked cargo container;

determining a current connection configuration for radio connections between the gateway and the plurality of sensors;

selecting a preferred connection configuration from a plurality of connection configurations for establishing radio connections between the gateway and the plurality of sensors based on the at least one of a material of construction, dimensions, or cargo capacity of the currently tracked cargo container, the preferred connection configuration having at least one of operating frequency, channel spacing, modulation type, or data transmission rate that is different from the current connection configuration; and in response to the selecting, causing the gateway and at least one of the plurality of sensors to switch from the current connection configuration to the preferred connection configuration for establishing a new radio connection.

2. The method of claim 1, wherein identifying the preferred connection configuration comprises:

ranking a plurality of valid connection configurations based on their suitability for at least one of the system or the currently tracked cargo container; and selecting the highest ranked one of the plurality of valid connection configurations as the preferred connection configuration.

3. The method of claim 1, wherein identifying the preferred connection configuration comprises:

identifying one or more viable radio connections between the gateway and the plurality of sensors; and determining a quality of the one or more viable radio connections based on at least one of a received signal strength indicator (RSSI), bit error rate (BER), or a number of cyclic redundancy check (CRC) errors for the one or more viable radio connections.

4. The method of claim 1, wherein identifying the preferred connection configuration comprises:

receiving, at the gateway from a remote server, information identifying:
sensors with which the gateway has had no previous communication; or
presence of the gateway within a predefined geo-fence, and identifying the preferred connection configuration based on the information received from the remote server.

5. The method of claim 1, wherein causing the gateway and the at least one of the plurality of sensors to switch to the preferred connection configuration comprises:

determining that the gateway and the plurality of sensors are communicably connected by a first radio connection; and transmitting, by the gateway to one or more of the plurality of sensors via the first radio connection, a message containing:
the preferred connection configuration; and
an instruction to use the preferred connection configuration to establish a new radio connection with the gateway.

6. The method of claim 1, wherein causing the gateway and the at least one of the plurality of sensors to switch to the preferred connection configuration comprises:

determining that there is no radio connection between the gateway and the at least one sensor; and transmitting, by the at least one sensor, a request to the gateway to establish a new radio connection using the preferred connection configuration.

7. The method of claim 6, further comprising:

iterating, by the at least one sensor, through a plurality of valid connection configurations to establish a new radio connection with the gateway using one of the plurality of valid connection configurations during a predefined first communication period;

in response to determining that no radio connection is established during the first communication period using any of the plurality of valid connection configurations:
switching, by the at least one sensor, to a sleep mode until the first communication period lapses, the at least one sensor disabling radio functionalities in the sleep mode; and
initiating, by the at least one sensor, iteration through the plurality of valid connection configurations to establish a new radio connection with the gateway at a beginning of a next communication period.

8. The method of claim 1, wherein the gateway is implemented on a mobile transceiver, and wherein at least one of the mobile transceiver or the plurality of sensors is physically coupled to the tracked cargo container.

9. The method of claim 1, wherein the preferred connection configuration has at least one of number of channels, frequency deviation, spreading factor, filter type, bandwidth-time product, or output power that is different from the current connection configuration.

10. A mobile transceiver, comprising:
memory;
a short-range communication module; and
a processor coupled to the memory and the short-range communication module, the processor being configured to:
determine at least one of a material of construction, dimensions, or cargo capacity of a currently tracked cargo container;
determine a current connection configuration for radio connections between the mobile transceiver and a plurality of sensors of a system for tracking assets;
select a preferred connection configuration from a plurality of connection configurations for establishing radio connections between the mobile transceiver and the plurality of sensors based on the at least one of a material of construction, dimensions, or cargo capacity of the currently tracked cargo container, the preferred connection configuration having at least one of operating frequency, channel spacing, modulation type, or data transmission rate that is different from the current connection configuration; and
in response to the selecting, switch from the current connection configuration to the preferred connection configuration for establishing a new radio connection with at least one of the plurality of sensors.

11. The mobile transceiver of claim 10, wherein identifying the preferred connection configuration comprises:

ranking a plurality of valid connection configurations based on their suitability for at least one of the system or the currently tracked cargo container; and selecting the highest ranked one of the plurality of valid connection configurations as the preferred connection configuration.

12. The mobile transceiver of claim 10, wherein identifying the preferred connection configuration comprises:

identifying one or more viable radio connections between the gateway and the plurality of sensors; and determining a quality of the one or more viable radio connections based on at least one of a received signal strength indicator (RSSI), bit error rate (BER), or a number of cyclic redundancy check (CRC) errors for the one or more viable radio connections.

13. The mobile transceiver of claim 10, wherein identifying the preferred connection configuration comprises:
receiving, at the gateway from a remote server, information identifying:
sensors with which the gateway has had no previous communication; or
presence of the gateway within a predefined geo-fence, and
identifying the preferred connection configuration based on the information received from the remote server.

14. The mobile transceiver of claim 10, wherein switching to the preferred connection configuration comprises:
determining that the mobile transceiver and the plurality of sensors are communicably connected by a first radio connection; and
transmitting, to one or more of the plurality of sensors via the first radio connection, a message containing:
the preferred connection configuration; and
an instruction to use the preferred connection configuration to establish a new radio connection with the mobile transceiver.

15. The mobile transceiver of claim 10, wherein the preferred connection configuration has at least one of number of channels, frequency deviation, spreading factor, filter type, bandwidth-time product, or output power that is different from the current connection configuration.

16. An asset tracking system, comprising:
a mobile transceiver associated with a currently tracked cargo container;
at least one sensor configured to:
determine at least one of a material of construction, dimensions, or cargo capacity of the currently tracked cargo container;
determine a current connection configuration for radio connections between the at least one sensor and the mobile transceiver;
select a preferred connection configuration from a plurality of connection configurations for establishing radio connections between the at least one sensor and the mobile transceiver based on the at least one of a material of construction, dimensions, or cargo capacity of the currently tracked cargo container, the preferred connection configuration having at least one of operating frequency, channel spacing, modulation type, or data transmission rate that is different from the current connection configuration; and
in response to the selecting, switch from the current connection configuration to the preferred connection configuration for establishing a new radio connection with the mobile transceiver.

17. The asset tracking system of claim 16, wherein switching to the preferred connection configuration comprises:
determining that there is no radio connection between the at least one sensor and the mobile transceiver; and
transmitting a request to the mobile transceiver to establish a new radio connection using the preferred connection configuration.

18. The asset tracking system of claim 16, wherein the at least one sensor is configured to:
iterate through a plurality of valid connection configurations to establish a new radio connection with the mobile transceiver during a predefined first communication period; and
in response to determining that no radio connection is established during the first communication period using any of the plurality of valid connection configurations:
switch to a sleep mode until the first communication period lapses, the at least one sensor disabling radio functionalities in the sleep mode; and
initiating iteration through the plurality of valid connection configurations to establish a new radio connection with the mobile transceiver at a beginning of a next communication period.

* * * * *